UNITED STATES PATENT OFFICE.

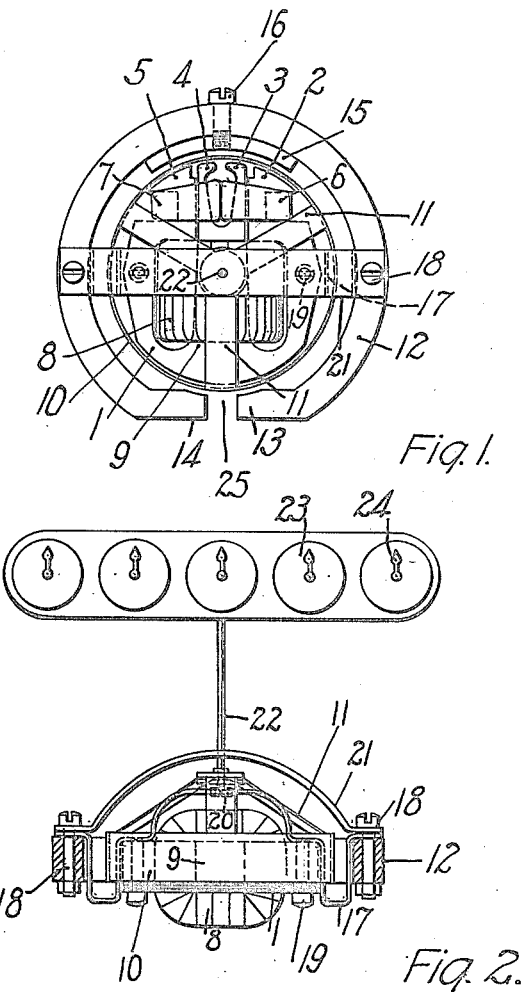

WILLIAM M. BRADSHAW, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,253,204.  Specification of Letters Patent.  Patented Jan. 15, 1918.

Application filed April 15, 1914. Serial No. 831,965.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments, and particularly to motor meters for use in connection with alternating current circuits.

An object of my invention is to provide an electrical measuring instrument of the induction type having a permanent magnet that serves the double purpose of acting as a return path for the electromagnetic lines of force, and as a damping magnet.

Another object of my invention is to provide a meter which is compact in construction and possesses such novel features as adapt it to the service to be performed.

Figure 1 of the accompanying drawings is a top plan view of an electrical measuring instrument embodying my invention, and Fig. 2 is a front view, partially in elevation and partially in section, of the instrument shown in Fig. 1.

A magnetizable core member 1 has a plurality of polar projections 2, 3, 4 and 5, which are spaced apart and around which are disposed the current windings 6 and 7, for purposes hereinafter described. A voltage winding 8 is disposed upon the central leg 9 of the magnetizable core 1. The free ends of the projections 2, 3, 4 and 5 and the opposite portion of the body portion of the magnetizable core 1 have a substantially cylindrical curvature. A light weight metal cylinder 10 is open at its lower end and is provided with a plurality of arms 11 at its upper end which terminate at its central axis for supporting the same. The cylindrical member 10 constitutes the armature of the motor and is disposed around the magnetizable core 1, substantially as shown in the drawing. A permanent magnet 12 of substantially annular form is disposed around the rotatable armature 10 for the double purpose of acting as a return path for the magnetic lines of force from the magnetizable core 1 and as a damping magnet for the armature. The poles 13 and 14 of the magnet 12 are located adjacent to the cylindrically curved end of the magnetizable member 1. A soft iron member 15 is attached by a screw 16 to the magnet 12 adjacent to the polar projections 2, 3, 4 and 5. A member 17 is attached to the opposite sides of the magnet 12 by screws 18 and extends within the armature 10 to support the magnetizable member 1, which is attached thereto by screws 19, and to support the armature at a point 20 which coincides with its central axis. A member 21 is also attached to the magnet 12 by the screws 18 to serve as a guide for the shaft 22 of the armature 10. The shaft 22 is associated, at its upper end, with an integrating mechanism, the dials 23 of which coöperate with pointers 24 for the purpose of registering the rotations of the armature.

The windings 6 and 7 are usually connected in series relation to the conductors that carry the energy to be measured and the winding 8 is usually connected in shunt relation to such conductors. Since there is a relatively large number of turns in the winding 8, the current flowing through the same will not be in phase with the current flowing through the windings 6 and 7 which have a relatively small number of turns. The two magnetic fluxes that differ in phase will pass from the polar projections 2, 3, 4 and 5 through the armature to the member 15 and, by reason of their phase relation, will cause the armature to rotate. The magnetic lines of force, after intercepting the armature, pass through the magnetic circuit provided by the permanent magnet 12 to the opposite end of the magnetizable core 1. Since the member 12 is a permanent magnet, a local magnetic circuit will also be established from the poles 13 and 14, through the armature 10, the cylindrically curved end of the magnetizable member 1 and an air gap 25 between the said poles to damp or retard the rotation of the armature. The shifting field set up in the air gap between the member 15 and the polar projections 2, 3, 4 and 5 is identical with the field set up in other instruments of the induction type, and hence needs no further explanation.

While the device hereinbefore described is adapted for the measurement of energy, it is primarily a motor, and I accordingly intend that the appended claims shall be construed to cover motors irrespective of the purposes for which they are utilized.

Although the specific form of construction shown is preferred, it is obvious that many modifications may be made within the spirit of the invention, and I desire to include all such modifications within the scope of the appended claims.

I claim as my invention:

1. An electrical measuring instrument comprising a magnetizable core having polar projections that are spaced apart, a cylindrical armature rotatably mounted to surround the magnetizable core, and a substantially annular permanent magnet disposed around the cylindrical armature and having its poles disposed adjacent the portion of the core opposite to the polar projections.

2. An electrical measuring instrument comprising a magnetizable core having polar projections that are spaced apart, a potential winding upon the core, a current winding disposed upon the polar projections, a cylindrical armature rotatably mounted to surround the core, and a substantially annular permanent magnet disposed around the cylindrical armature and having its poles disposed adjacent the portion of the core opposite to the polar projections.

3. An electrical measuring instrument comprising a magnetizable core having polar projections that are spaced apart, a potential winding upon the core, a current winding disposed upon the polar projections, a cylindrical armature rotatably mounted to surround the core, and a means for conducting the magnetic lines of force from one end of the magnetizable core through an external circuit to the other end of the same and for damping the movement of the armature.

4. In an electrical measuring instrument, the combination with a magnetizable core having polar projections, of a cylindrical armature rotatably disposed around the said core, and a magnetizable member disposed around the said armature for damping the rotation of the same and for returning the magnetic lines of force to the said magnetizable core.

5. In an electrical measuring instrument, the combination with a magnetizable core, of a cylindrical armature rotatably disposed around the said core, a permanent magnet disposed around the said armature, and means attached to the said permanent magnet for supporting the said magnetizable core and the said armature.

6. In a motor-meter, the combination with a magnetizable core member having spaced-apart polar projections and constituting the driving member of the meter, of a cylindrical armature rotatively disposed around the entire core member, and a substantially annular permanent magnet disposed around the armature and having its poles adjacent the end of the core member opposite to the spaced-apart polar projections.

7. In an electrical measuring instrument, the combination with a magnetizable core having polar projections, a potential winding on the core and a current winding disposed on the polar projections, of a cylindrical armature surrounding the magnetizable core, a permanent magnet disposed around the said armature, and means attached to the permanent magnet to support the magnetizable core and the said armature.

8. In an electrical measuring instrument, the combination with a magnetizable core, of a cylindrical armature rotatably supported at its upper end, a permanent magnet, and means attached to the said permanent magnet for supporting the said armature and magnetizable core.

9. In an electrical measuring instrument, the combination with a magnetizable core having spaced-apart polar projections, a potential winding on the core and current windings disposed on the polar projections, of an armature entirely surrounding the magnetizable core, and a single keeper and damping magnet surrounding the armature.

10. In an electrical measuring instrument, the combination with a magnetizable core having spaced-apart polar projections, a potential winding on the core and current windings disposed on the projections, of an armature entirely surrounding the core, and a single means for damping the movements of the armature and for returning the magnetic flux from the polar projections to the core.

11. An electrical measuring instrument comprising a magnetizable core having spaced-apart polar projections and constituting the actuating electromagnet of the instrument, a cylindrical armature surrounding the entire core and a permanent magnet surrounding the armature for damping the movement thereof and for constituting a keeper for the core.

12. An electrical measuring instrument comprising a magnetizable core having spaced-apart polar projections and constituting the actuating electromagnet of the instrument, a cylindrical armature surrounding the entire core and a permanent magnet surrounding the armature for damping the movement thereof and for constituting a return magnetic path for the lines of force from one end of the magnetizable core to the other.

13. In a motor-meter, the combination with a magnetizable core member constituting the driving member of the meter, of a cylindrical armature rotatably disposed around the entire core, and means disposed around the armature for damping the movement of the same and for constituting a return magnetic path for the flux from the core member.

In testimony whereof, I have hereunto subscribed my name this 25th day of Mar., 1914.

WILLIAM M. BRADSHAW.

Witnesses:
HAROLD B. TAYLOR,
B. B. HINES.